Figure 1:
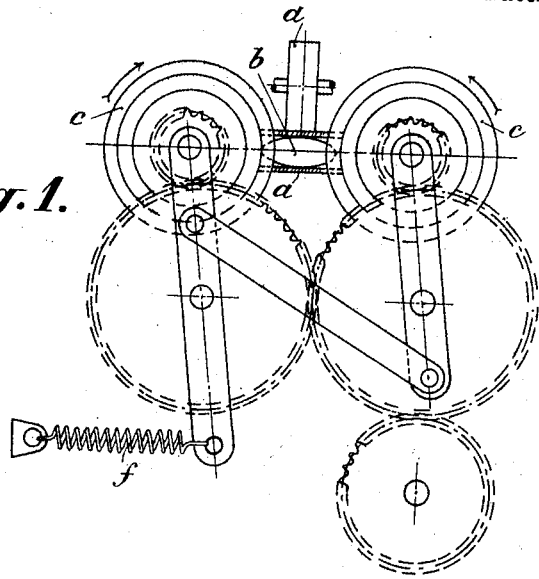

J. A. OLSEN.
METHOD OF AND MACHINE FOR PREPARING LEGUMINOUS FRUITS AND THE LIKE WITHOUT STRIPPING OFF THE STRINGS.
APPLICATION FILED NOV. 4, 1919.

1,338,035.

Patented Apr. 27, 1920.

Inventor:
Johan Alfred Olsen

UNITED STATES PATENT OFFICE.

JOHAN ALFRED OLSEN, OF COPENHAGEN, DENMARK.

METHOD OF AND MACHINE FOR PREPARING LEGUMINOUS FRUITS AND THE LIKE WITHOUT STRIPPING OFF THE STRINGS.

1,338,035.  Specification of Letters Patent.  Patented Apr. 27, 1920.

Application filed November 4, 1919. Serial No. 335,703.

*To all whom it may concern:*

Be it known that I, JOHAN ALFRED OLSEN, a subject of the King of Denmark, residing at No. 61, Strandvej, Copenhagen, in the Kingdom of Denmark, have invented certain new and useful Improvements in Methods of and Machines for Preparing Leguminous Fruits and the like without Stripping Off the Strings, of which the following is a specification.

This invention has as its object the preparation of leguminous fruits, and the like, without stripping off the tough strings that grow along each side of the pod.

The invention consists in making, by mechanical means, many shallow, transverse incisions in the edges of the pods, whereby the strings are severed at short intervals, so that the pods become just as easy to chew as if the strings had been stripped off, and whereby the strings become no longer noticeable.

The drawing shows, by way of example, a device which is suitable for making these incisions according to the present method.

Figure 2:
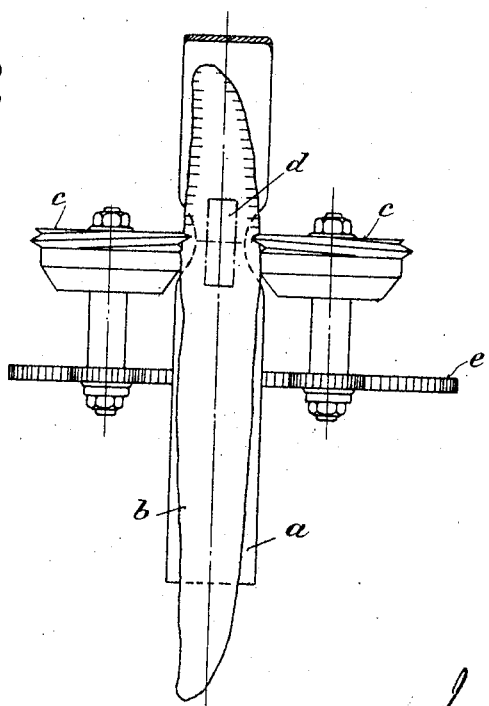

In the drawing Figure 1 is an end-view of the machine, partly in transverse section and Fig. 2 is a top-view of the most important parts of the machine.

In the drawing $a$ is a rest on which the pod $b$ is slid forward between the knives $c$, which have worm-shaped edges. The circular knives are caused to turn in opposite directions by means of a suitable cog-gear $e$, and they are by means of a suitable spring $f$ held pressed toward each other and thus against the pod which is pushed forward between them. In order to keep the pod in place, it is pressed down against the rest $a$ by means of a guide-roller $d$.

Instead of circular knives with worm-shaped edges, it is also possible to use simple knife-disks or segments of knife-disks, or cutting or breaking members similar to cog-wheels, with radially placed knives, whose edges are placed at a right angle to or obliquely against the edge of the pod, the action of said members on the edge of the pod being more like breaking than cutting. The rest $a$ may consist of an endless tape, by whose movement the pods are carried forward, and one of the knives may be substituted by a pressure-roller, if it is desirable to cut or break the pod-string along only one edge of the pod.

On the whole the shown details are not essential to the nature of the invention, and may be modified in many different ways.

I claim:—

1. The method of preparing leguminous fruits and the like which consists in making in the edges of the pod at close intervals shallow incisions, indentations or the like so as to sever the strings.

2. In the method as specified in claim 1 the further step of continuously feeding the pod along lengthwise, as the incisions are made.

3. Device for preparing leguminous fruits and the like comprising opposed rotating members for making incisions, indentations or the like in the edges of the fruit so as to sever the strings, and means for yieldingly pressing the said members gently toward each other.

4. Device as specified in claim 3, comprising a means for continuously feeding the fruit lengthwise between the said rotating members.

5. Device for preparing leguminous fruit and the like comprising opposed rotating circular knives having a worm-shaped cutting edge, and means for yieldingly pressing said knives gently toward each other.

6. Device as specified in claim 5, comprising a continuously moving feeding means for feeding the fruit lengthwise between the knives, and a guiding means for holding the fruit in position on said feeding means.

In testimony whereof I affix my signature in the presence of two witnesses.

JOHAN ALFRED OLSEN.

Witnesses:
 C. W. EASKOW,
 N. SURCHJENSEN.